United States Patent
Shinogi et al.

[11] Patent Number: 6,124,148
[45] Date of Patent: Sep. 26, 2000

[54] METHOD OF MANUFACTURING SEMICONDUCTOR ACCELERATION SENSOR

[75] Inventors: Masataka Shinogi; Yutaka Saitoh; Kenji Kato, all of Chiba, Japan

[73] Assignee: Seiko Instruments R&D Center Inc., Japan

[21] Appl. No.: 08/844,151

[22] Filed: Apr. 18, 1997

[30] Foreign Application Priority Data

Apr. 19, 1996 [JP] Japan ................................. 8-098892
Feb. 19, 1997 [JP] Japan ................................. 9-035313

[51] Int. Cl.⁷ ................................................. H02L 21/00
[52] U.S. Cl. ........................... 438/52; 438/53; 438/460; 438/462; 257/254; 257/417; 148/DIG. 28
[58] Field of Search ................... 438/50, 52, 53, 438/460, 462, FOR 385, FOR 388, FOR 468; 257/254, 417, 418; 148/DIG. 28

[56] References Cited

U.S. PATENT DOCUMENTS

| | | | |
|---|---|---|---|
| 3,912,563 | 10/1975 | Tomioka et al. | 156/13 |
| 4,605,919 | 8/1986 | Wilmer | 338/2 |
| 5,266,528 | 11/1993 | Yamada | 437/226 |
| 5,547,598 | 8/1996 | Amano et al. | 252/62.3 T |

FOREIGN PATENT DOCUMENTS

| | | |
|---|---|---|
| 19531058A1 | 3/1996 | Germany. |
| 406302690 | 10/1994 | Japan. |
| 407020145 | 1/1995 | Japan. |

OTHER PUBLICATIONS

Patent Abstracts of Japan, vol. 008, No. 099 (E–243) May 10, 1984.
Patent Abstracts of Japan, vol. 095, No. 006 Jul. 31, 1995.
Patent Abstracts of Japan, vol. 096, No. 006 Jun. 28, 1996.
Patent Abstracts of Japan, vol. 097, No. 008 Aug. 29, 1997.

*Primary Examiner*—Wael Fahmy
*Assistant Examiner*—Long Pham
*Attorney, Agent, or Firm*—Adams & Wilks

[57] ABSTRACT

A method of manufacturing a semiconductor acceleration sensor comprises forming a strain sensing section on a surface of a semiconductor wafer, fixing the semiconductor wafer to a cooled fixing stage, cutting out a structural body having the strain sensing section from the semiconductor wafer, and connecting a support member to the structural body cut from the semiconductor wafer.

15 Claims, 9 Drawing Sheets

FIG. 11A
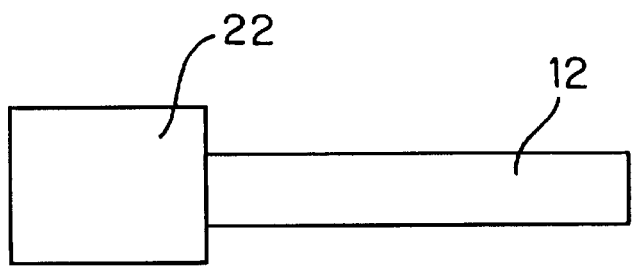
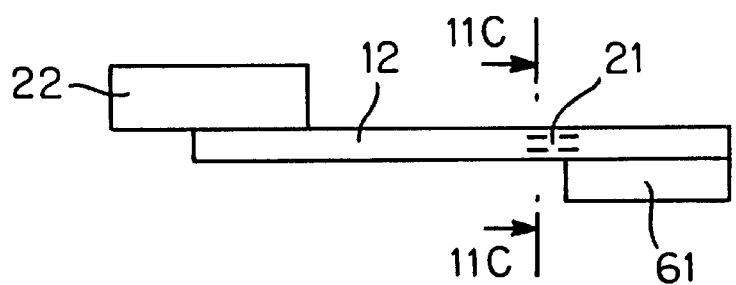
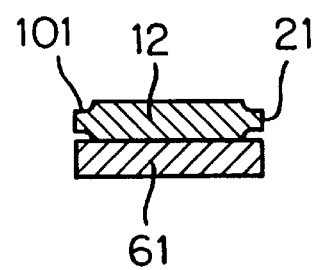
FIG. 11B
FIG. 11C

METHOD OF MANUFACTURING SEMICONDUCTOR ACCELERATION SENSOR

BACKGROUND OF THE INVENTION

The present invention relates to a semiconductor device including a semiconductor acceleration sensor which converts displacement into an electrical signal by utilizing the piezoresistance effect exhibited by a semiconductor crystal such as a silicon crystal.

In recent years, with the development of micromachining technology, a semiconductor acceleration sensor is manufactured by forming a thin film on a semiconductor wafer and then etching it (Refer to IEEE Transactions on Electron Devices, Vol. ED-26, No. 12, December 1979, for instance).

FIGS. 3 shows a conventional semiconductor acceleration sensor manufactured by micromachining. FIG. 3A is a top view and FIG. 3B is a sectional view. A cantilever 51 and a weight 22 are formed by etching a semiconductor wafer 1. The cantilever 51 is made thinner than the other portions by etching. The cantilever 51 is deformed when receiving acceleration in the direction indicated by an arrow in FIG. 3B. The deformation amount of the cantilever 51 is detected through the piezoresistance effect exhibited by a diffusion resistor 21a that is formed on the top surface of the cantilever 51, and acceleration is determined through comparison with a diffusion resistor 21b. The diffusion resistors 21a and 21b are connected to high-concentration diffusion regions 55 and output terminals 23. A top stopper 53 and a bottom stopper 54 are provided to prevent breakage of the cantilever 51, and the entire structure is mounted on a ceramic substrate 52.

FIG. 4 shows a semiconductor acceleration sensor manufactured by micromachining which is disclosed in Japanese Unexamined Patent Publication No. Hei. 1-302167. A groove 62 is formed by etching in a cantilever 51 in the vicinity of a support 61 to provide a thin portion. Diffusion resistors 21 formed on the top face of the sensor constitute a bridge circuit. Diffusion resistors 21c and 21d, which serve as reference resistors, are provided on the top face of the support 61. Diffusion resistors 21e and 21f, which serve as variable resistors for detecting the deformation amount of the thin portion, are so provided as to be perpendicular to the reference resistors.

The conventional semiconductor acceleration sensors are manufactured by etching. In particular, in order to increase the detection sensitivity, it is necessary to form the thin portion (the back face is processed). Since the thin portion is formed by etching, it is necessary to strictly manage the composition and the temperature of an etching liquid and stirring conditions in order to obtain uniform thickness, and additional manufacturing steps such as masking pattern formation are needed.

Further, since the diffusion resistors 21a and 21b are arranged and the weight 22 is formed on the top face of the acceleration sensor as shown in FIG. 3A, the top face of the acceleration sensor has a large area, which, for instance, restricts the number of sensors taken from one silicon wafer, causing a difficulty in reducing the manufacturing cost.

Also in the acceleration sensor of FIG. 4, to keep a sufficient level of strength of the thin portion, the width of a cantilever 51 and the width in the direction from this side to the deep side in the figure need a given value. Therefore, like the acceleration sensor of FIG. 3A, the area of the sensor top face of the acceleration sensor cannot be made small, which restricts the number of sensors taken from the semiconductor wafer 1, causing a difficulty in reducing the cost.

Further, since the diffusion resistors 21 for acceleration detection are provided on the face of the acceleration sensor which face is to receive acceleration, they need to be so arranged as to cause a large difference in resistance between the reference resistors that are located above the support 61 and the variable resistors.

The present invention has been made to solve the above problems, and an object of the invention is therefore to provide an inexpensive semiconductor acceleration sensor which can be manufactured easily and allows a large number of sensors to be manufactured from one semiconductor wafer 1, as well as to provide a manufacturing method for obtaining a pressure sensor.

SUMMARY OF THE INVENTION

To solve the above problems, according to the invention, diffusion resistors 21 are arranged on a side face 100 of a sensor to manufacture many sensors from one semiconductor wafer 1. With this configuration in which a displacement amount detection means is provided on the sensor side face 100, a highly accurate, inexpensive sensor can be obtained by a manufacturing process of a smaller number of steps including no etching step.

As a means for manufacturing the above device, a method of cutting out a sensor element 12 by dicing is employed. In this case, a means for fixing the semiconductor wafer 1 is such that the semiconductor wafer is fixed to a fixing section with ice. This enables the sensor of the present invention to be obtained as an ideal rectangular parallelepiped body, which facilitates fixing and release of the sensor. As a result, it becomes possible to provide a semiconductor device including a semiconductor acceleration sensor that is manufactured at a high yield and a low cost.

BRIEF DESCRIPTION OF THE DRAWINGS

FIG. 11A–11C are plan views showing the configuration of the semiconductor acceleration sensor to which the manufacturing method of the present invention has been applied.

DETAILED DESCRIPTION OF THE PREFERRED EMBODIMENTS

A manufacturing method of the present invention will be described below in a specific manner.

Figure 5:
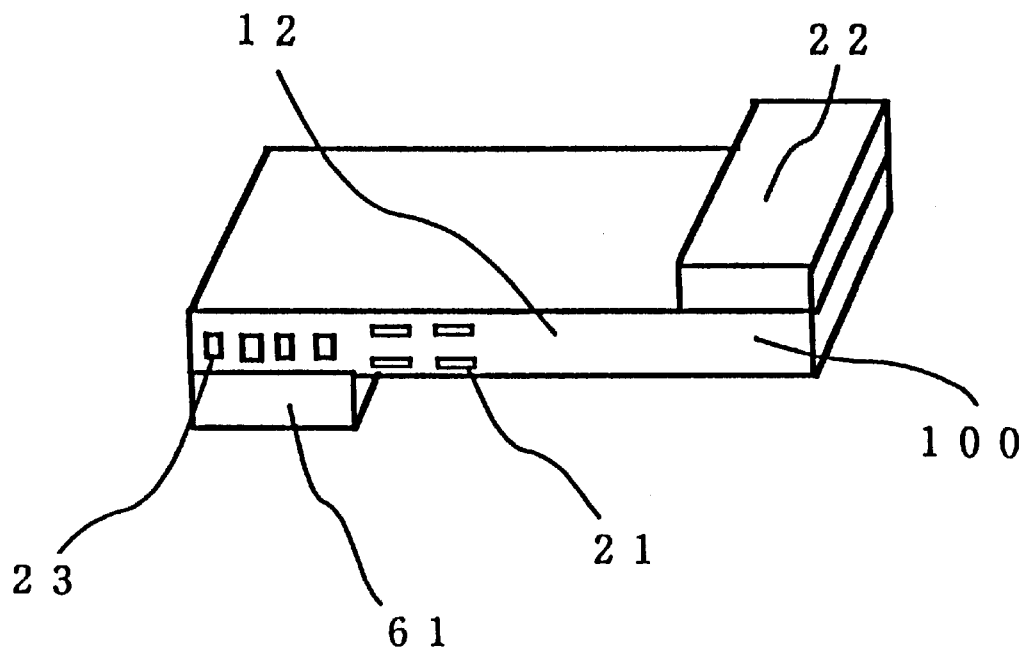
FIG. 5 is a perspective view showing the configuration of a semiconductor acceleration sensor to which a manufacturing method of the present invention has been applied.

FIG. 5 shows the configuration of a semiconductor acceleration sensor to which the manufacturing method of the present invention has been applied. The semiconductor acceleration sensor is a rectangular parallelepiped structural body which has been cut out from a semiconductor wafer 1 and on which diffusion resistors 21, output terminals, etc. are formed. This structural body is hereinafter called a sensor element 12. A weight 22 is bonded to the sensor element 12. To obtain electrical contacts with a support 61, bumps are formed on the output terminals 23. The bumps are made of gold or solder. Electrical connections may be established without using bumps.

Figure 6A:
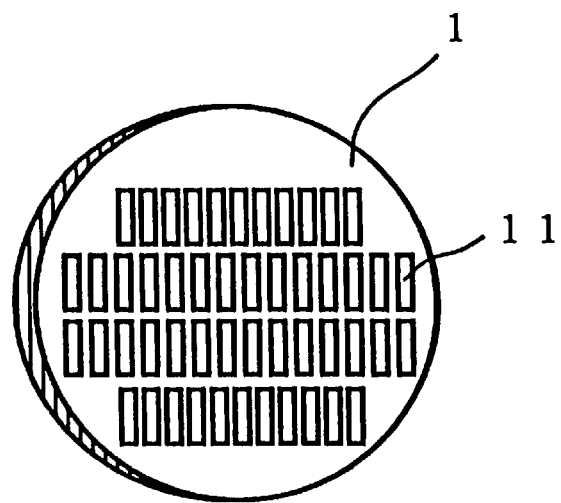
FIGS. 6A–6C are process diagrams of the semiconductor acceleration sensor to which the manufacturing method of the present invention is applied.
Figure 6B:
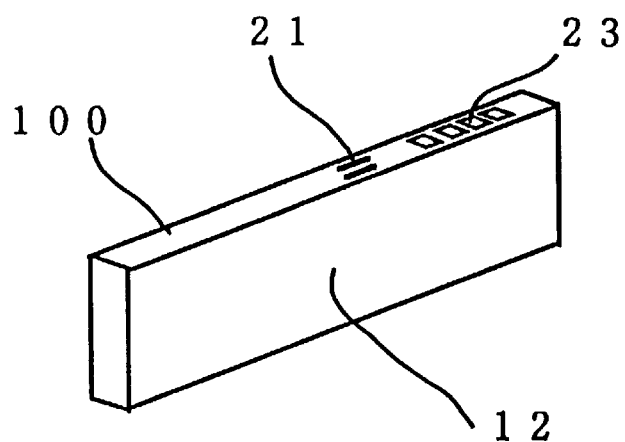
Figure 6C:
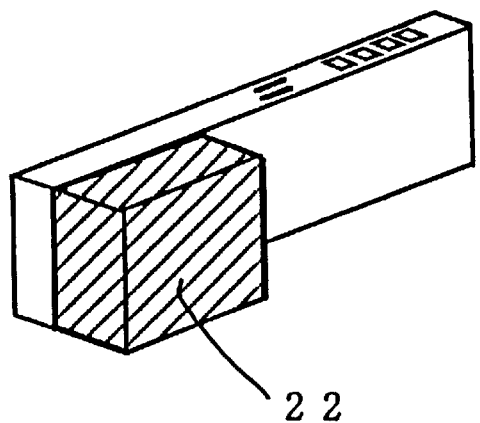

A detailed manufacturing method will be described with reference to FIGS. 6. Sensor element patterns 11 are formed in which diffusion resistors 21 and output terminals 23 are patterned on the surface of a semiconductor wafer 1 in FIG. 6A. The semiconductor wafer 1 is so cut that the diffusion resistors 21 and the output terminals 23 are located on the same plane, to thereby obtain a rectangular parallelepiped sensor element 12 as shown in FIG. 6B. Finally, a weight 22 is bonded to the rectangular parallelepiped sensor element 12 as shown in FIG. 6C. Preferably, the semiconductor wafer 1 is cut by dicing. As for the dicing, lines for scribing are formed along the outlines of sensor element patterns 11, and cutting is performed by dicing with the scribe lines used as a reference. The acceleration sensor elements 12 are laid out in the semiconductor wafer 1. After the step shown in FIG. 6C, assembling and packaging are performed.

This embodiment is directed to the manufacture of a low-acceleration element. Low acceleration means acceleration of 1 to 2 G (1 G=9.8 m/s2). The length, width W, and height Z of the entire element are 9 mm (movable portion: 6 mm, support portion: 3 mm), 0.6 mm, and 0.1 mm, respectively. Incidentally, low-acceleration acceleration sensors are used for earthquake detection, virtual reality, and other purposes.

In the manufacturing method of the invention, the step in FIG. 6B, in which the rectangular parallelepiped sensor element 12 is produced by dicing from the semiconductor wafer 1, is performed by using a fixing stage which is cooled to fix the semiconductor wafer 1.

A specific embodiment of the invention will be hereinafter described based on FIG. 1.

Figure 1:
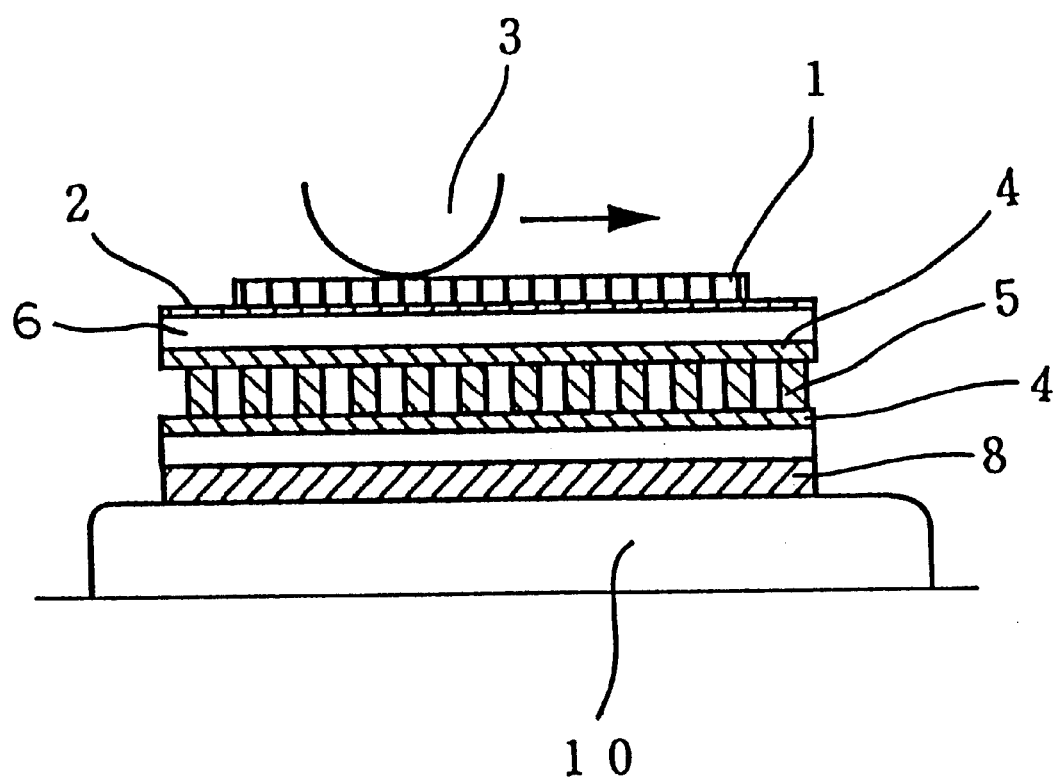
FIG. 1 is a sectional view showing a manufacturing method of the present invention.

FIG. 1 is a sectional view of a manufacturing apparatus for manufacturing a semiconductor acceleration sensor of the present invention.

As for its configuration, the fixing stage comprises a freezing chuck 6 mounted on a stage 10 of a base or dicing machine. When the fixing stage is cooled, the semiconductor wafer 1 is frozen to thereby fix the semiconductor wafer onto the freezing chuck 6. The semiconductor wafer 1 is fixed to the freezing chuck 6 through an ice layer 2. The present invention employs a scheme in which the freezing chuck 6 is mounted on the stage 10 because of the use of the existing dicing machine. However, there may naturally be employed a configuration in which the stage 10 is configured as the freezing chuck 6.

Figure 8:
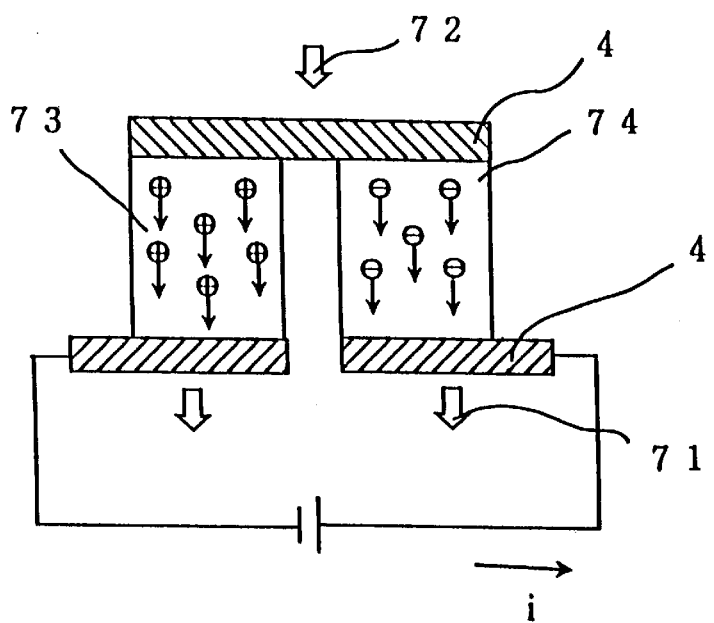
FIG. 8 is an explanation diagram showing the principle of a thermoelectric conversion semiconductor element.

The freezing chuck 6 has a thermoelectric conversion element comprising thermoelectric conversion semiconductor elements 5. The principle of the thermoelectric conversion element will be described below with reference to FIG. 8.

Each of the thermoelectric conversion semiconductor elements 5 constitutes a π-shaped series circuit in which two kinds of thermoelectric semiconductors, i.e., a p-type element 73 and an n-type element 74, are joined together by a metal electrode (plate) 4. If DC current is caused to flow from the n-type semiconductor 74 to the p-type semiconductor 73, heat moves in the opposite direction to the current direction in the n-type semiconductor and in the same direction as the current direction in the p-type semiconductor, so that the top metal piece is cooled to cause heat absorption 72 from the environment.

The thermoelectric semiconductor elements 5 are constituted of semiconductors which are in most cases bismuth or tellurium, and are two types of semiconductors, i.e., an n-type (electrons-excessive) semiconductor and a p-type (electrons-deficient) semiconductor that are produced by impurity doping.

The thermoelectric semiconductor elements 5 require a heat dissipation mechanism for effecting heat generation 71 to dissipate the sum of heat coming from the low-temperature side and heat corresponding to power that is consumed inside the module. In the freezing chuck 6 used in the present invention, this is done by a water-cooling mechanism.

As for the sizes of the components of the invention, the stage 10 is 300 mm Φ, the freezing chuck 6 is L200 mm×W200 mm×t15 mm, the semiconductor wafer 1 is 6 inches Φ.

A manufacturing method using the freezing chuck 6 will be described below. The freezing chuck 6 is mounted on the stage 10 of the dicing machine. The freezing chuck 6 is constituted of a DC power supply and a water-cooling cooling plate 8 for cooling, i.e., heat dissipation. First, a dummy semiconductor wafer (not shown) is placed on the freezing chuck 6, and then the semiconductor wafer 1 (work) on which the diffusion resistors 21 etc. are patterned is placed. As for the dummy semiconductor, since the work is completely cut out in the dicing, if the dummy semiconductor wafer does not exist, the freezing chuck 6 would also be cut. This is the reason why the dummy wafer is interposed. Thereafter, freezing is started by causing current flow from the DC power supply, whereby the semiconductor wafer 1 and the freezing chuck 6 are fixed with each other by freezing. The freezing chuck 6 and the semiconductor wafer 1 are fixed with each other through the ice layer 2 by freezing.

Figures 2A, 2B:
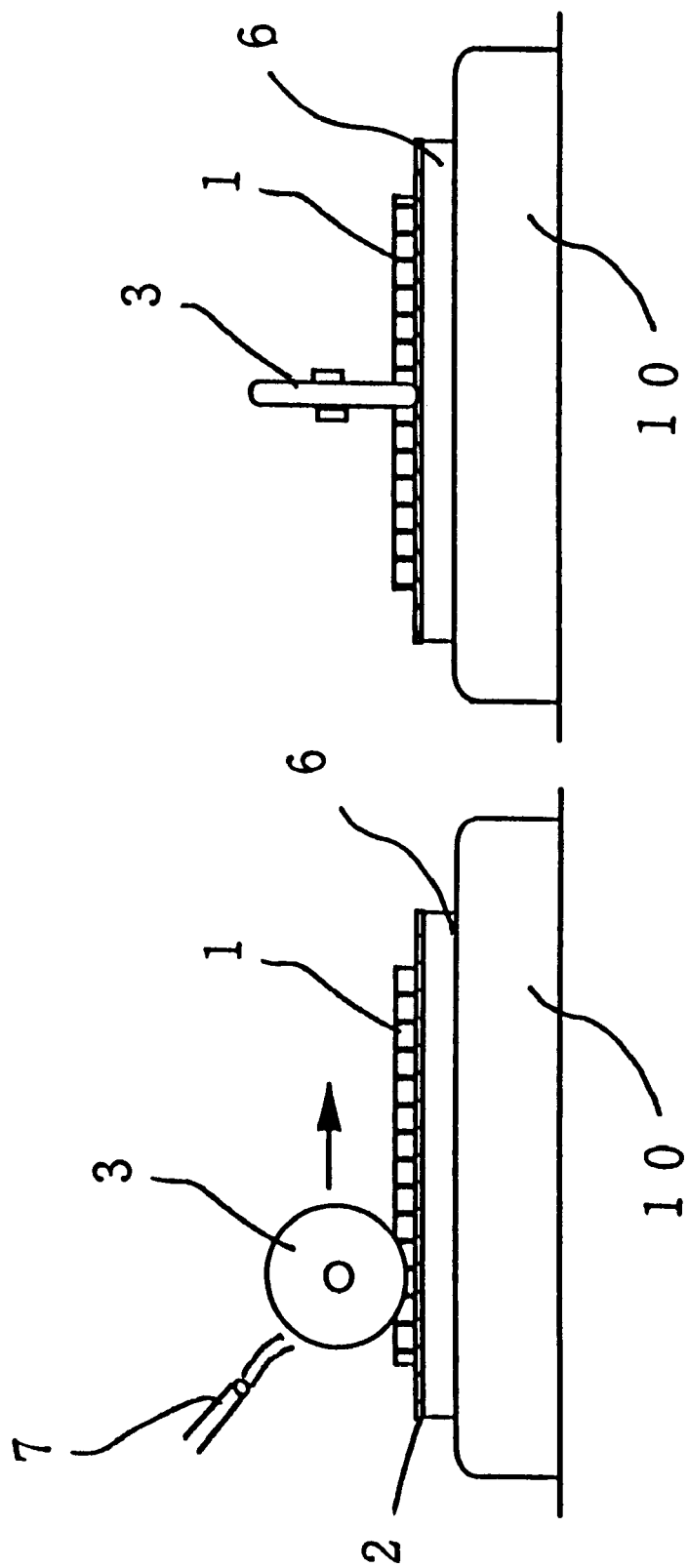
FIGS. 2A–2B are front view and a side view showing a drawing method of a semiconductor acceleration sensor according to the present invention.
Figure 3A:
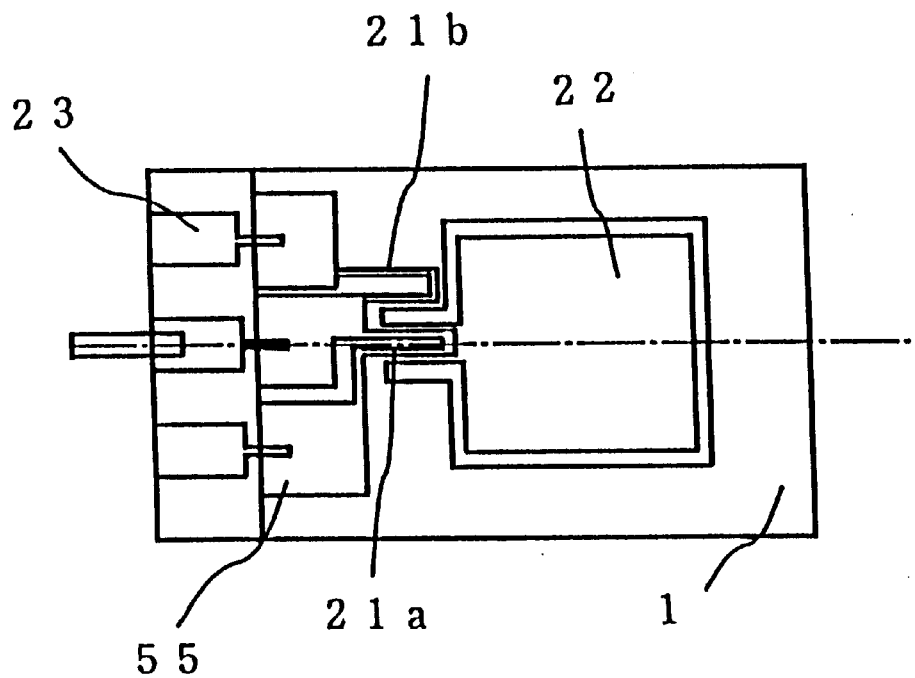
FIGS. 3A–3B are top view and a sectional view showing a drawing method of a conventional semiconductor acceleration sensor.
Figure 3B:
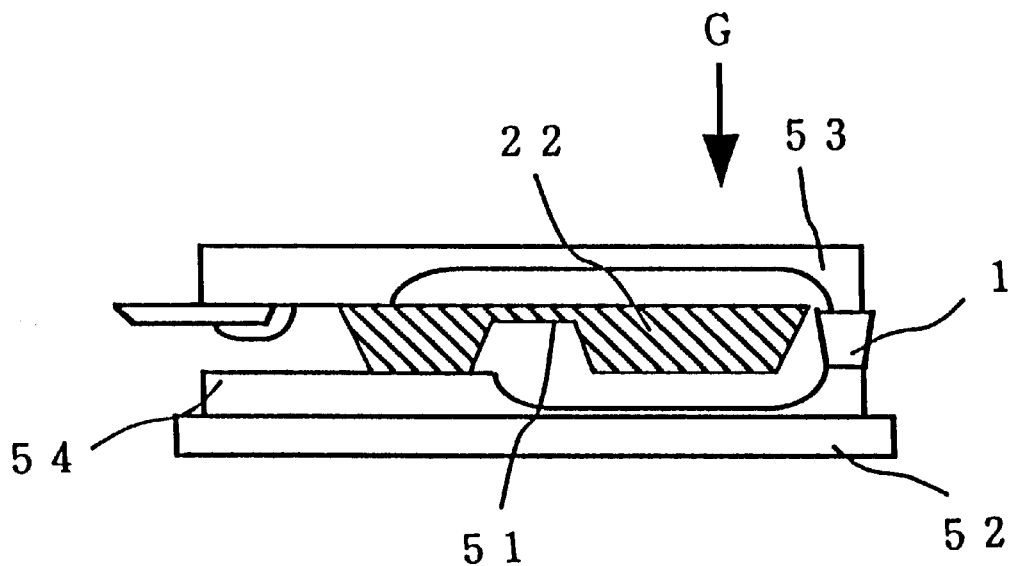
Figure 4:
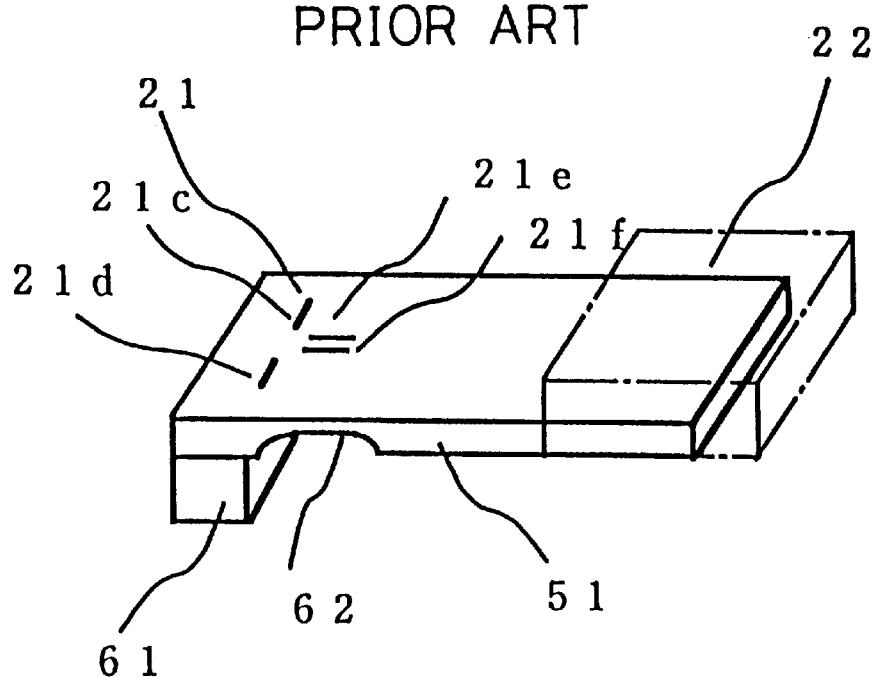
FIG. 4 is a perspective view showing the configuration of a conventional semiconductor acceleration sensor.

FIG. 2A and 2B are a front view and a side view illustrating a cutting method of the present invention.

As seen from FIGS. 2A and 2B the freezing chuck 6 is mounted on the machine stage 10. After the dummy semiconductor wafer 1and the semiconductor wafer (work) are placed on the freezing chuck 6, they are cooled and fixed to the freezing chuck 6 through the ice layer 2. Alternatively, the dummy semiconductor wafer may not be used.

In the present invention, it is necessary that the ice layer 2 not be melted by heat generated between a rotary cutting blade 3 (blade) of the dicing and the work (semiconductor wafer) and that cutting water that is sprayed on the blade 3 not be frozen. Conditions for satisfying such requirements are important. In this embodiment, good results were obtained by setting the surface temperature of the freezing chuck 6 at 15° C. and using ethylene glycol as an antifreeze.

First, the dicing blade 3 is positioned in the Z-axis direction with respect to the machine stage 10. That is, Z-alignment is performed with the surface of the machine stage 10 used as the origin. In this embodiment, the freezing chuck 6 is 15 mm thick and the dummy semiconductor wafer is 0.6 mm thick. Therefore, the distance is set at 15 mm +0.62 mm in order to completely cut out an element, with an evaluation that the ice layer is 0.1 mm thick.

Next, cutting is effected by moving the blade 3 left to right in FIG. 2A with the feeding rate in the X-direction set at 100 mm/min. During the cutting, the antifreeze is supplied to the blade 3 so that a cutting liquid 7 is not frozen and the cutting is enabled.

Figure 7:
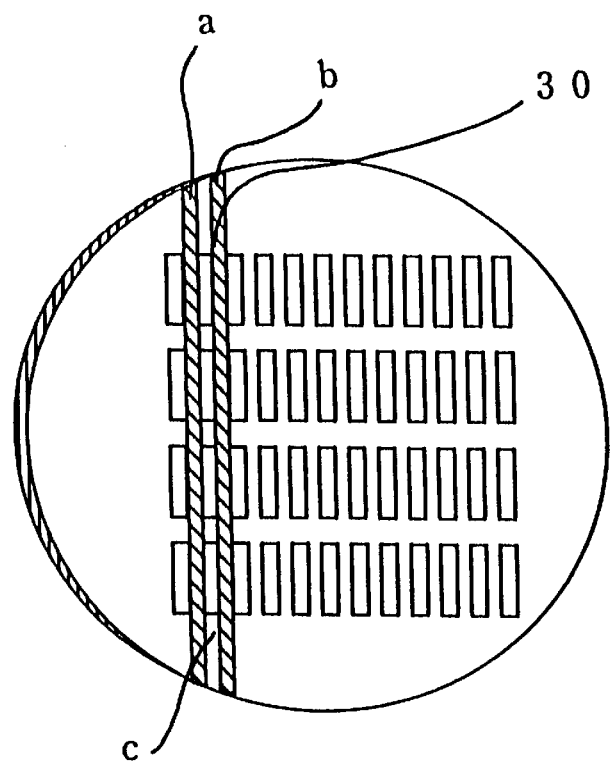
FIG. 7 is a top view of a semiconductor wafer illustrating conventional dicing.

In general, a film for fixing the semiconductor wafer 1 is used when dicing is performed. An adhesive is usually applied to one surface of the fixing film. Being made of polymer film, the fixing film is expandable. For example, as shown in FIG. 7, a groove 30 is formed by cutting at position a with the dicing machine. When cutting is performed at position b, a residual portion moves because a portion c to become a sensor element 12 receives cutting resistance due to the dicing leftward in FIG. 7. As a result, the cutting face of the sensor element 12 is inclined. In this conventional method, the degree of orthogonality was 10 degrees. Even with a UV sheet which is high both in tackiness and detachability and which can be released due to a reduction in tackiness factor when illuminated with ultraviolet light, the degree of orthogonality was 7 degrees.

Although a method using wax is known, it has a difficulty in shortening the process because of difficulties in attachment/detachment and release.

According to the manufacturing method of the present invention, by virtue of a degree of orthogonality of less than 1 degree, results that satisfy the specifications of the semiconductor acceleration sensor were obtained, thereby verifying that the manufacturing method is superior.

Sensor elements taken out by cutting in the above manner were provided with weights and subjected to assembling. The basic characteristics of an acceleration sensor, such as the application acceleration vs. output voltage characteristic and the frequency characteristic, were measured by producing acceleration with a vibrator, superior results were obtained.

By applying the manufacturing method of the present invention to the semiconductor acceleration sensor, it has become possible to provide highly accurate semiconductor acceleration sensors at a low price without using a conventional wet process. When semiconductor acceleration sensors produced by the manufacturing method of the present invention were mounted on a vehicle and used as air-bag-operating sensors for lifesaving at the time of collision, desired characteristics were obtained to show that they were within the range suitable for actual use.

Figure 9:
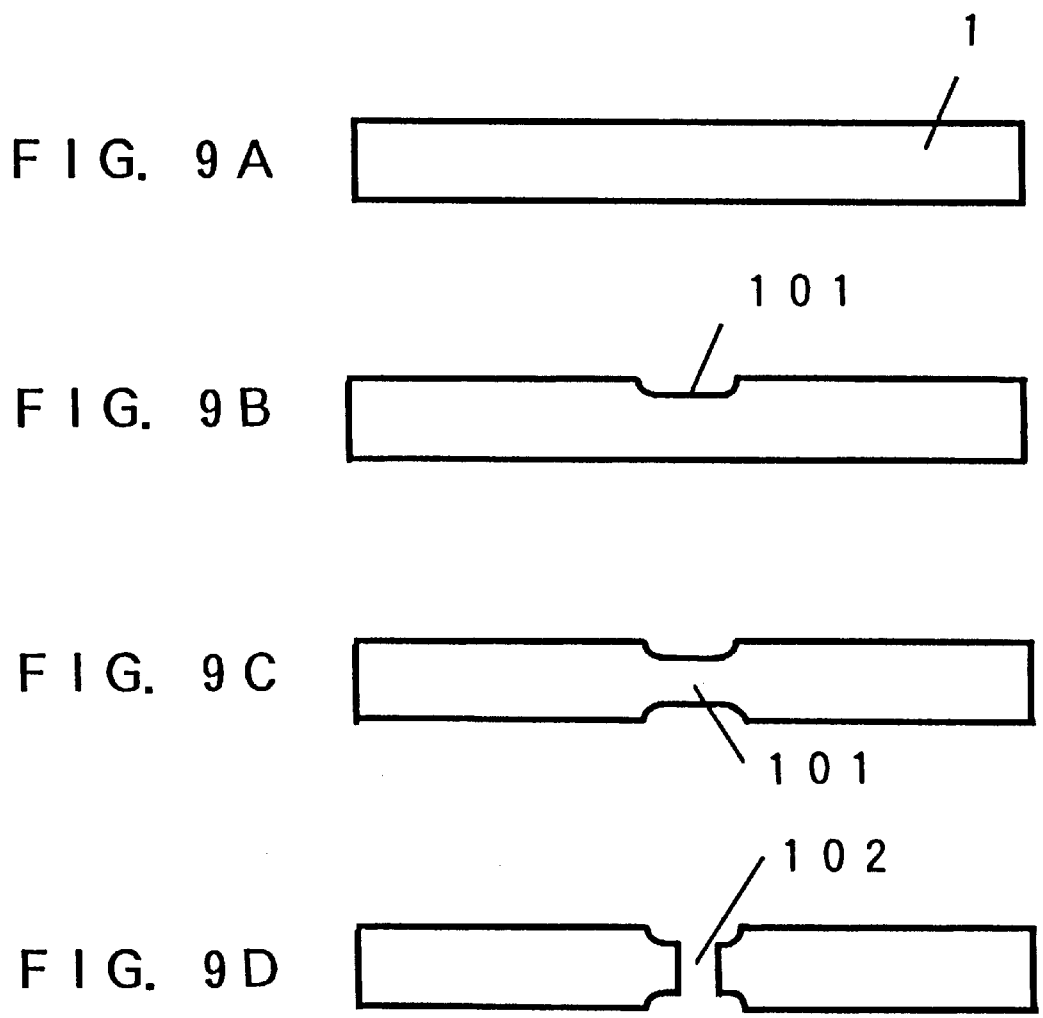
FIGS. 9A–9D are process diagrams showing a manufacturing method according to the present invention.

A further description will be made of a manufacturing method which is directed to a case where even a minute chipping of an element is a problem. In usual dicing, chippings occur when the cutting blade 3 of the dicing cuts the semiconductor wafer 1. In particular, large chippings occur at an instant when the cutting blade 3 just penetrates through the semiconductor wafer 1. Back-side chippings sometimes amount to more than 50 microns. This is particularly problematic when narrow elements are cut out as in the case of the present invention. The invention has solved the above problem by a method shown in FIGS. 9. This method provides superior results not only in the case of using the freezing chuck 6 of the invention but also in the case of the ordinary fixing that uses an adhesive sheet or wax. FIG. 9A shows a semiconductor wafer 1 having a strain sensing section. First, a shallow groove 101 as shown in FIG. 9B is formed on the surface of the semiconductor wafer 1. In the present invention, the shallow groove 101 is 0.1 mm wide and 0.03 mm deep. Next, as shown in FIG. 9C, another groove 101 is formed on the back surface side by dicing. Thus, the shallow grooves are formed at the same position on both front and back sides. A penetrated groove 102 as shown in FIG. 9D is formed at the center of the above grooves. To effect penetration, a cutting blade 3 of 0.03 mm was used. According to this method, elements can be formed without causing any chipping on device surface layers.

A description will be made of a case where the present invention is applied to a semiconductor acceleration sensor shown in FIG. 10.

The semiconductor acceleration sensor is a rectangular parallelepiped structural body which has been cut out from a semiconductor wafer 1 and on which diffusion resistors 21, output terminals 23, etc. are formed. A weight 22 is bonded to a sensor element 12. To obtain electrical contacts with a support 61, bumps are formed on the output terminals 23. The bumps are made of gold or solder. Electrical connections may be established without using bumps. In the acceleration sensor according to the present invention, the diffusion resistors 21 as a detecting section are formed on a face perpendicular to the face that is to receive acceleration. The diffusion resistors 21 constitute a Wheatstone bridge, to allow an output with respect to applied acceleration to be output in the form of voltage or current.

Figure 10:
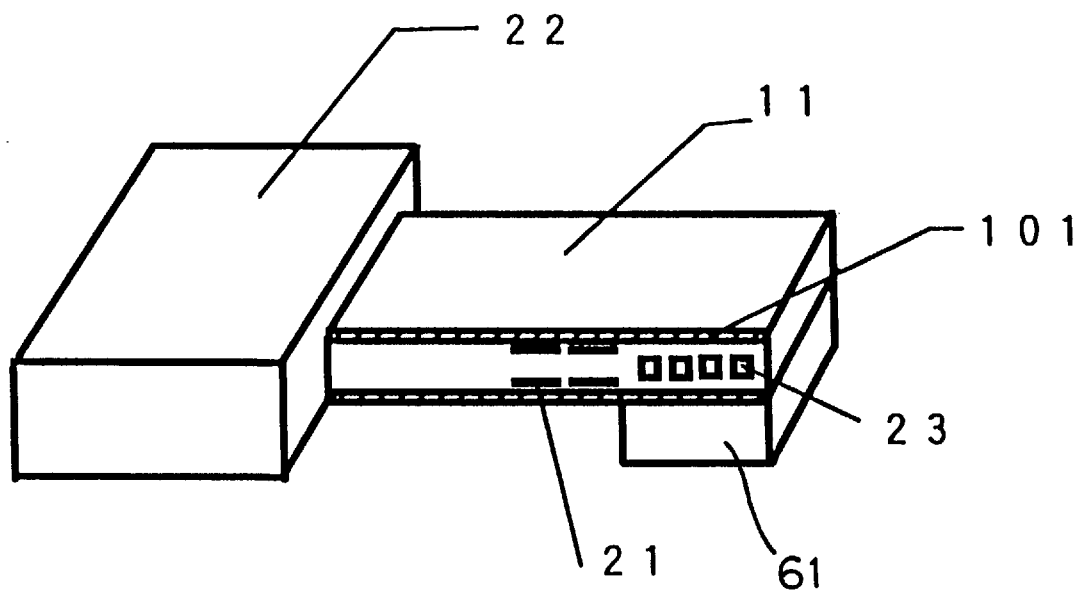
FIG. 10 is a perspective view showing the configuration of a semiconductor acceleration sensor to which the manufacturing method of the present invention has been applied.

When the dicing method of the invention is applied to the acceleration sensor, steps indicated by hatched lines occur in the vicinity of the diffusion resistors 21 as shown in FIG. 10. In the case of the acceleration sensor under consideration, grooves 101 are formed as shown in the cross-sectional view of FIG. 11C. Although the grooves 101 reduce the stress that is exerted on the diffusion resistors by about 10%, the yield and the reliability are greatly improved. No breakage due to chipping occurs in a drop test. Thus, it has become possible to manufacture products in a stable manner.

Having the above-described constitution, the present invention has the following advantages.

(1) Since a sensor element can be manufactured with a high degree of orthogonality, a highly accurate sensor can be manufactured.

(2) Because of easy attachment/detachment operations, the process can be shortened, contributing to cost decrease.

(3) There occurs no clogging of a dicing blade due to an adhesive sheet, elongating the life of the blade.

(4) Because of the fixing by solidification, no deviation occurs in work position, contributing to reduction in chipping amount.

What is claimed is:

1. A method of manufacturing a semiconductor acceleration sensor, comprising the steps of:

forming strain sensing sections on a surface of a semiconductor wafer;

fixing the semiconductor wafer to a cooled fixing stage;

cutting out a rectangular parallelepiped structural body having one of the strain sensing sections from the semiconductor wafer; and joining a support member to the rectangular parallelepiped structural body cut out from the semiconductor wafer.

2. A method of manufacturing a semiconductor acceleration sensor according to claim 1; wherein the semiconductor wafer has diffusion resistors disposed in a portion of the surface thereof having the strain sensing sections; and wherein the cutting step includes cutting out the structural body such that a dimension of the surface portion of the semiconductor wafer in a direction perpendicular to a longitudinal direction of the diffusion resistors is shorter than a thickness of the semiconductor wafer.

3. A method of manufacturing a semiconductor acceleration sensor according to claim 1; wherein the fixing stage has a thermoelectric conversion element for cooling the fixing stage; and wherein the fixing step includes fixing the semiconductor wafer by cooling the fixing stage with the thermoelectric conversion element.

4. A method of manufacturing a semiconductor acceleration sensor according to claim 3; wherein the thermoelectric conversion element has a first surface for cooling the fixing stage and a second surface opposite the first surface; and wherein the fixing step includes cooling the second surface of the thermoelectric conversion element using a heat dissipation member disposed over the first surface of the thermoelectric conversion element.

5. A method of manufacturing a semiconductor acceleration sensor according to claim 1; wherein the cutting step comprises cutting the semiconductor wafer using a cutting blade; and further comprising the step of supplying an antifreeze liquid to the cutting blade during the cutting step.

6. A method of manufacturing a semiconductor acceleration sensor according to claim 1; wherein the cutting step includes forming grooves in front and back surface portions of the semiconductor wafer, and cutting out the rectangular parallelepiped structural body having the strain sensing section from the semiconductor wafer by forming a penetrating groove through the grooves in the front and back surface portions to penetrate through the semiconductor wafer, the penetrating groove being narrower than the grooves in the front and back surface portions.

7. A method of manufacturing a semiconductor acceleration sensor according to claim 6; wherein the step of forming the penetrating groove comprises forming the penetrating groove using a cutting blade.

8. A method of manufacturing a semiconductor acceleration sensor, comprising the steps of: providing a semiconductor wafer having a strain sensing section for sensing an acceleration; disposing the semiconductor wafer on a fixing stage; cooling the fixing stage to fix the semiconductor wafer to the fixing stage; and cutting out a generally rectangular parallelepiped-shaped body having the strain sensing section from the semiconductor wafer.

9. A method according to claim 8; further comprising the step of connecting a support member to the rectangular parallelepiped-shaped structural body cut out from the semiconductor wafer.

10. A method of manufacturing a semiconductor acceleration sensor, comprising the steps of: providing a semiconductor wafer having a strain sensing section for sensing an acceleration; disposing the semiconductor wafer on a fixing stage; cooling the fixing stage to fix the semiconductor wafer to the fixing stage; cutting out a structural body having the strain sensing section from the semiconductor wafer; and connecting a support member to the structural body cut out from the semiconductor wafer.

11. A method of manufacturing a semiconductor acceleration sensor, comprising the steps of: providing a semiconductor wafer having a strain sensing section disposed on a surface portion thereof for sensing an acceleration and having diffusion resistors disposed in the surface portion of the semiconductor wafer; disposing the semiconductor wafer on a fixing stage; cooling the fixing stage to fix the semiconductor wafer to the fixing stage; and cutting out a structural body having the strain sensing section from the semiconductor wafer such that a dimension of the surface portion of the semiconductor wafer in a direction perpendicular to a longitudinal direction of the diffusion resistors is shorter than a thickness of the semiconductor wafer.

12. A method of manufacturing a semiconductor acceleration sensor, comprising the steps of: providing a semiconductor wafer having a strain sensing section for sensing an acceleration; disposing the semiconductor wafer on a fixing stage having a thermoelectric conversion element for cooling the fixing stage, the thermoelectric conversion element having a first surface for cooling the fixing stage and a second surface opposite the first surface; fixing the semiconductor wafer to the fixing stage by cooling the second surface of the thermoelectric conversion element using a heat dissipation member disposed over the first surface of the thermoelectric conversion element; and cutting out a structural body having the strain sensing section from the semiconductor wafer.

13. A method of manufacturing a semiconductor acceleration sensor, comprising the steps of: providing a semiconductor wafer having a strain sensing section for sensing an acceleration; disposing the semiconductor wafer on a fixing stage; cooling the fixing stage to fix the semiconductor wafer to the fixing stage; and cutting out a structural body having the strain sensing section from the semiconductor wafer by forming grooves in front and back surface portions of the semiconductor wafer and cutting out the structural body from the semiconductor wafer by forming a penetrating groove through the grooves in the front and back surface portions to penetrate the semiconductor wafer.

14. A method according to claim 13; wherein the penetrating groove is narrower than the grooves formed in the front and back surface portions of the semiconductor wafer.

15. A method according to claim 13; wherein the step of forming the penetrating groove comprises forming the penetrating groove using a cutting blade.

* * * * *